Sept. 12, 1939.　　　F. L. HUMPHREY　　　2,172,907
CLOTHESLINE REEL AND STRETCHER
Filed Oct. 15, 1936
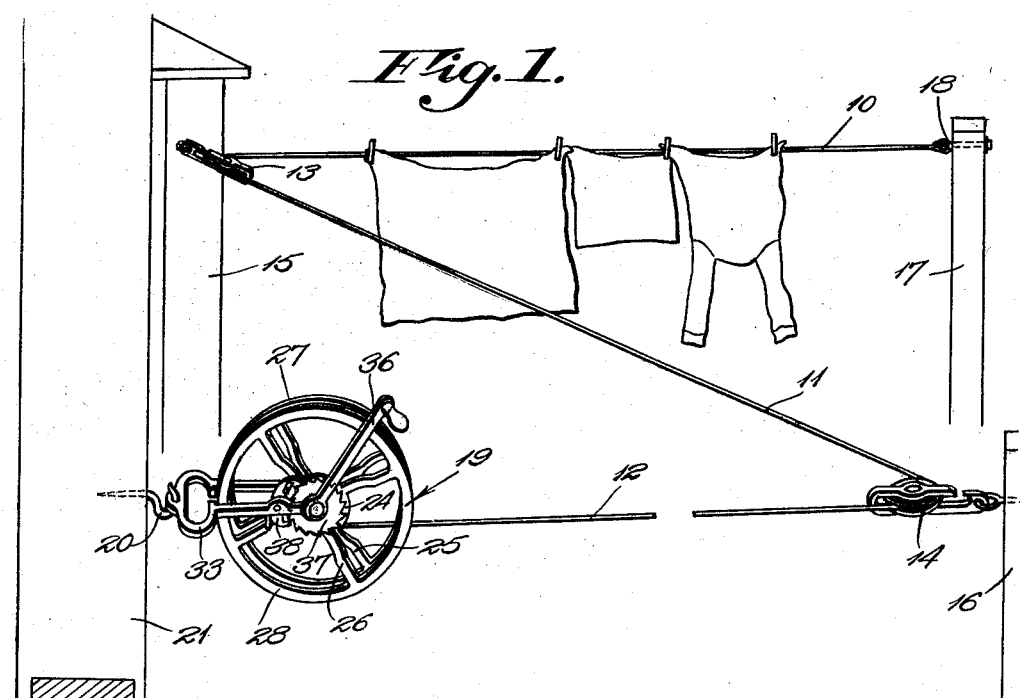
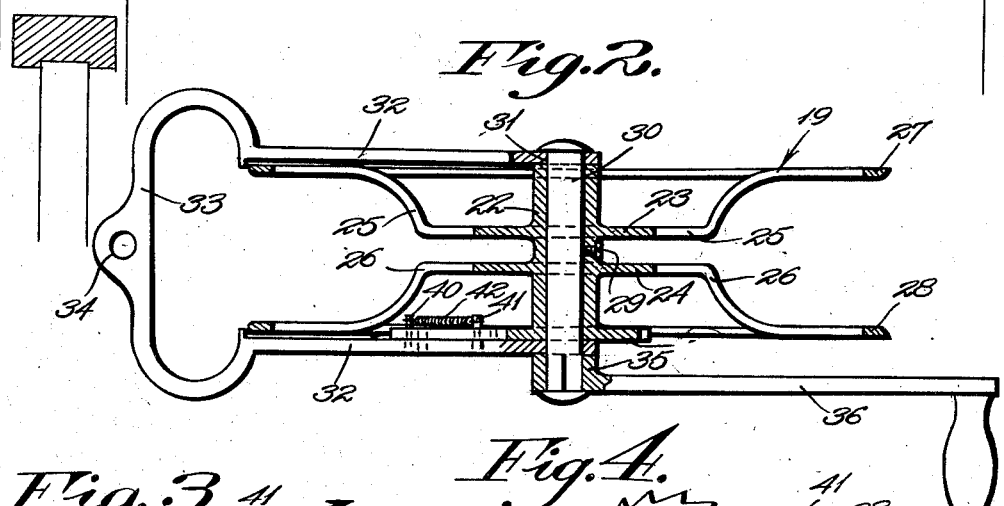
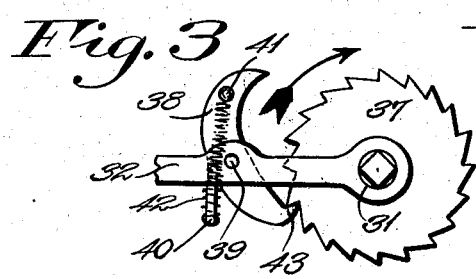
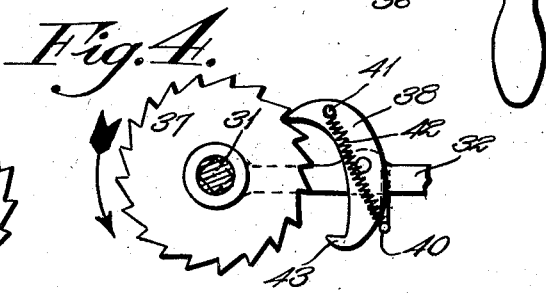
Frank L. Humphrey
INVENTOR
BY Victor J. Evans & Co.
ATTORNEYS
WITNESS Patented Sept. 12, 1939

2,172,907

UNITED STATES PATENT OFFICE 2,172,907

CLOTHESLINE REEL AND STRETCHER

Frank L. Humphrey, Wichita, Kans.

Application October 15, 1936, Serial No. 105,811

1 Claim. (Cl. 242—100)

This invention relates to clothes line reels and stretchers and has for an object to provide a reel having a narrow channel adjacent to the hub of the reel which channel, as the clothes line is nearly unwound, permits the diameter around which the line is wound to reduce quickly to a small diameter whereby advantageous leverage is obtained for stretching the line taut; also the narrow channel, as the line is being reeled, causes the line to build up quickly to large diameter so that the entire length of the line may be wound up much quicker than is ordinarily the case with conventional reels.

A further object of the invention is to provide a ratchet device including a ratchet wheel and a spring pressed pawl which, when thrown past center in one direction engages the ratchet wheel and prevents retrograde movement of the reel for stretching the line, and when thrown past center in the opposite direction exerts a sufficient pressure on the ratchet wheel to check too freely rotation of the ratchet wheel as the line is being unreeled.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1 is a perspective view of a clothes line reel and stretcher constructed in accordance with the invention, in applied position.

Figure 2 is a plan view of the reel with parts in section.

Figure 3 is a detail elevation showing the ratchet device and showing the pawl in one operative position.

Figure 4 is a detail elevation of the reverse side of the ratchet device showing the pawl in another operative position.

Referring now to the drawing in which like characters of reference designate similar parts in the various views, 10, 11 and 12 designate three portions of a clothes line reversed upon itself and supported at two of the bends by sheaves 13 and 14 attached to convenient supports such as a porch post 15 and a post 16. The initial end of the clothes line is secured to a post 17 by an eye bolt 18 and the terminal end of the clothes line is secured to a reel and stretcher designated in general by the numeral 19 and which may be secured by a screw hook 20 to a convenient support such as a porch post 21.

The clothes line reel and stretcher forming the subject matter of this invention comprises a cylindrical hub 22. The hub is provided with a pair of spaced parallel discs 23 and 24 which are disposed close together near the center of the hub and provide a narrow channel to receive the clothes line, one end of which is fixed in any preferred manner to the hub. The discs are provided with radially extending oppositely disposed spokes 25 and 26, the outer ends of which are bowed outwardly away from each other and then continued radially parallel with the discs but spaced at a considerably greater distance apart than the discs, as shown in Figure 2. The ends of the spokes are connected together by respective rims 27 and 28. The ends of the spokes and the rims provide a wide channel of U-shaped cross section beyond the narrow channel formed by the discs of the reel.

The hub is fixed by means of a set screw 29 to a shaft 30, the ends of which are rotatably received in openings 31 formed in the parallel legs 32 of an attaching bracket. The legs are formed integral with an elongated eye 33 which forms a grip for transporting the reel, and the eye is provided with a perforated lug 34 to receive the attaching hook 20.

One end of the shaft 30 is squared and the hub 35 of a crank handle 36 is provided with a squared opening to receive the squared end of the shaft. Thus when the crank handle is turned the shaft will be rotated and the reel 19, which is fixed to the shaft by the set screw 29, will be also rotated to unreel or to reel up and stretch the clothes line.

As best shown in Figures 3 and 4 a ratchet wheel 37 is formed integral with the reel hub 22. An arcuate pawl 38 is pivoted at substantially the center thereof on one leg 32 of the supporting bracket, as shown at 39. The leg of the bracket is provided with a depending L-shaped pin 40 and the pawl is provided with a lateral pin 41. A helical spring 42 has its ends connected to the L-shaped pin 40 and to the lateral pin 41. The lateral pin is disposed on the opposite side of the pivot 39 of the pawl from the hub 22 of the reel so that when the pawl is swung past center in one direction, as shown in Figure 3, a tooth 43 on one end of the pawl will yieldably engage the teeth of the ratchet wheel 37 and prevent too free rotation of the clothes line as it is being unreeled. When the pawl is swung past center in the opposite direction the other end of the pawl will engage the ratchet wheel, as shown in Figure 4, and prevent retrograde movement of the reel while the clothes line is being stretched.

By virtue of the narrow channel provided between the discs 23 and 24 as the line is about to be unwound, the line reduces quickly to a small diameter thus providing the advantageous leverage of a small diameter for stretching the line. Conversely, as the line is being wound up again, the narrow channel between the discs 23 and 24 permits the line to build up quickly to a large diameter so that the entire length of the line may be wound up much quicker than would be the case with the narrow channel.

From the above description it is thought that the construction and operation of the invention will be fully understood without further explanation.

What is claimed is:

A clothes line reel including a hub, spaced discs on opposite sides of the center of the hub disposed close together to provide a narrow channel at the center of the hub to permit two or three feet of a clothes line being wound thereon so that the line when nearly unwound is reduced to two or three layers of a width not much greater than the thickness of the clothes line, these layers being of small diameter so as not to be mashed when the clothes line is stretched but to be sufficiently supported by the discs forming the narrow channel as not to stretch while the remainder of the line is being stretched taut, and radially extending spokes connected at their inner ends to the discs and curved laterally to provide an annular wide channel of substantially U-shaped cross section to permit the clothes line building up quickly to wide layers of large diameter during rewinding to promote the entire length of the clothes line being quickly wound in the wide channel.

FRANK L. HUMPHREY.